United States Patent [19]

Manzoni

[11] Patent Number: 4,871,246
[45] Date of Patent: Oct. 3, 1989

[54] DEVICE FOR TRANSMITTING, WITHOUT VIBRATIONS, MOVEMENTS FROM AN ELECTRIC CONTROL TO A MIRROR-HOLDER PLATE OF A REARVIEW MIRROR

[75] Inventor: Bernard Manzoni, Saint-Claude, France

[73] Assignee: Societe Manzoni Bouchot, France

[21] Appl. No.: 202,884

[22] Filed: Jun. 6, 1988

[30] Foreign Application Priority Data

Jun. 5, 1987 [FR] France ............... 87 07951

[51] Int. Cl.$^4$ ............... B60R 1/06; G02B 7/18; F16H 1/26
[52] U.S. Cl. ............... 350/633; 74/89.15; 74/411; 310/83
[58] Field of Search ............... 350/634, 633, 637, 636; 248/481–483, 487; 74/89.15, 411; 310/80, 83

[56] References Cited

U.S. PATENT DOCUMENTS 4,482,211 11/1984 Fisher ............... 350/637
4,598,605 7/1986 Manzoni ............... 350/636
4,701,037 10/1987 Bramer ............... 350/634
4,740,068 4/1988 Fisher ............... 350/637

FOREIGN PATENT DOCUMENTS 149144 11/1979 Japan ............... 350/634

Primary Examiner—Jon W. Henry
Attorney, Agent, or Firm—Remy J. VanOphem

[57] ABSTRACT

A device for transmitting, without vibration, movements from an electric control to a mirror-holder plate of a rearview mirror, in which the mirror-holder plate is supported by the cover of the casing via a pivot cross and connected to two motors by two transmissions, each transmission having a screw coupled to a motor and meshing with a tangent wheel integral with a nut cooperating with a screw provided with a ball joint for connection with the plate. Each nut cooperates with a grip washer pushed by a spring washer to grip a spherical dish on the bottom of the casing, the seats of the dish being concentric with respect to a pivot point located between the bottom and the cover.

5 Claims, 2 Drawing Sheets

DEVICE FOR TRANSMITTING, WITHOUT VIBRATIONS, MOVEMENTS FROM AN ELECTRIC CONTROL TO A MIRROR-HOLDER PLATE OF A REARVIEW MIRROR

BACKGROUND OF THE INVENTION

1. Field of the Invention

The present invention relates to a device for transmitting, without vibrations, the up-down and left-right movements from an electrical control to a mirror-holder plate of a rearview mirror, particularly of an automobile vehicle.

2. Description of the Prior Art

A rearview mirror of the type illustrated in U.S. Patent No. 4,598,605 is described hereinafter with reference to the part reproduced in the invention, as shown in FIGS. 1 through 3 of the accompanying drawings.

The known rearview mirror has a casing made of plastic material, which includes a body 1 and a cover 2. It also includes a plate 3 on which a mirror is fixed. A cross presents two perpendicular pivot pins 4 and 5, clipped in a fork joint 6 on the plate and in a fork joint 7 on the cover, respectively.

The body 1 of the casing contains two electric motors 8 and 9 coupled to tangent screws 10 and 11 meshing with tangent wheels 12 and 13 integral with nuts 14 and 15 which cooperate with screws 16 and 17.

The screw 16 is provided with a ball joint 18 clipped in a bearing 19 of the plate 3 and, similarly, the screw 17 is provided with a ball joint clipped in another bearing (neither of which are shown in the drawing) of the plate. The mean geometrical axes 20 and 21 of the screws 16 and 17 are substantially perpendicular to the plate and disposed at 90° with respect to the center 22 where the pivot pins 4 and 5 cross.

Each of the nuts 14 and 15 is fixed against a bottom 23 of the body of the casing by means of a screw blocked in the tapped hole of a central boss in each nut. The head of the screw applies a washer against the outer face of the bottom and presses the nut against the inner face of the bottom.

This type of assembly does not enable the axis of each pinion to be permanently aligned with the axis of the corresponding control ball joint 18. This results in a considerable solidity and the necessity of providing an axial clearance which, even if very small, generates vibrations of the mirror and produces shaky images.

In U.S. Pat. No. 4,598,605, another type of connection is proposed in an attempt to overcome the drawback set forth hereinabove. Each of the nuts 14 and 15 is provided with a ball joint clipped in a bearing integrally made in the bottom 23 of the casing body. Its center of rotation lies very close to the bottom and towards the outside. In addition, its seat defined by the clip is disposed between the ball joint and the cover, a stop being opposite this eat in order to render the ball joint captive.

A first drawback of this known transmission device resides in the fact that, during pivoting of the mirror, through a maximum angle "a" in one direction or in the other, each of the geometrical axes 20 and 21 of the nuts 14 and 15 pivots through an angular amplitude such that their end ball joints rub against the walls of their housing and wear them out. Due to such wear, which occurs relatively quickly since the parts are made of plastic material and are small, the mirror vibrates, as in the prior art, when the vehicle is moving and the image that it reflects is shaky. This results in the driver's vision of the environment being disturbed and imperils safe driving conditions.

A second drawback is that manouevring of the mirror is not as smooth as might be desired, to the detriment of the precision and fidelity of the adjustments.

A third drawback is that, as the casing is made of molded plastic material and is of relatively small dimensions, serious difficulties are encountered when making the housings for the ball joints, resulting in imperfect guiding and holding of the ball joints.

In the device disclosed in U.S. Pat. No. 4,598,605, each nut is integral with the corresponding tangent wheel, with the result that transmission of the rotation from one to the other is effected in homokinetic manner, i.e. with a very high precision, and without clearance, i.e. without risk of vibrations at that level.

Another known rearview mirror of the same type is described in European Patent No. 112,140. In this rearview mirror, the pinion cooperating with a driving screw is separate from the nut cooperating with a driven screw. This arrangement makes it possible to place the center of pivoting of the nut inside the pinion so that the axis of the nut is always aligned with the axis of the ball joint actuating the mirror, when the motor driving the driving screw/pinion pair is controlled. In fact, the nut forms a sphere pivotally guided about its center in a spherical bushing of the pinion, the sphere being maintained in place by clipping by utilization of a deformable retaining lip.

For pivotally coupling the nut with the pinion, the means employed are constituted by two diametrically opposite, longitudinal flutes or ribs projecting into the spherical bushing and by two grooves made in the sphere. The grooves are divergent at their two ends in order to allow both the transmission of the rotation from the pinion to the nut and the freedom of pivoting of the sphere of the nut about is center.

Finally, a corrugated washer is interposed between the pinion and the casing to form an elastic stop.

European Patent No. 112,140, therefore, teaches that the center of pivoting of the nut may be brought closer to the ball joint actuating the mirror, which might make it possible to overcome the drawbacks set forth hereinabove of the rearview mirror according to U.S. Pat. No. 4,598,605.

However, this teaching cannot be retained within the scope of the latter Patent as, according to the European Patent, it necessitates that the nut be separate from the pinion, while, in U.S. Pat. No. 4,598,605, they are integral with each other. Now, the separation of the nut and pinion leads to serious drawbacks. The pivoting coupling of the sphere with the pinion generates, on the one hand, a non-homokenetic transmission of rotation, detrimental to the fidelity and precision of the adjustment, and, on the other hand, clearances promoting vibrations of the mirror. Clipping of the ball joint in the pinion does not ensure perfect hold of the ball joint, with the result that wear and clearance may occur. Finally, the corrugated washer opposes perfect positioning of the pinion, since it serves as support for the pinion and is deformable.

SUMMARY OF THE INVENTION

It is an object of the present invention to overcome the drawbacks of the rearview mirrors of the prior art and, to that end, it proposes an improved device in which the center of rotation of the nut of each transmission is removed from the bottom of the casing towards the cover and determined by two concentric spherical seats with reduced cambers, formed by the bottom. The concave seat lies inside the casing and cooperates with a complementary bearing surface of the nut, while the convex seat lies outside and cooperates with a complementary bearing surface of a grip washer, which is fitted on a rod of the nut passing through the bottom and is pressed by an elastic member abutting on and end projection of the rod. The elastic member may be a semi-toric washer.

Clearance is made between the bottom of the casing and the nut, around the spherical bearing surface thereof.

DETAILED DESCRIPTION OF THE PREFERRED EMBODIMENT

The rearview mirror forming the subject matter of the improvement is the one described hereinbefore.

Figure 1:
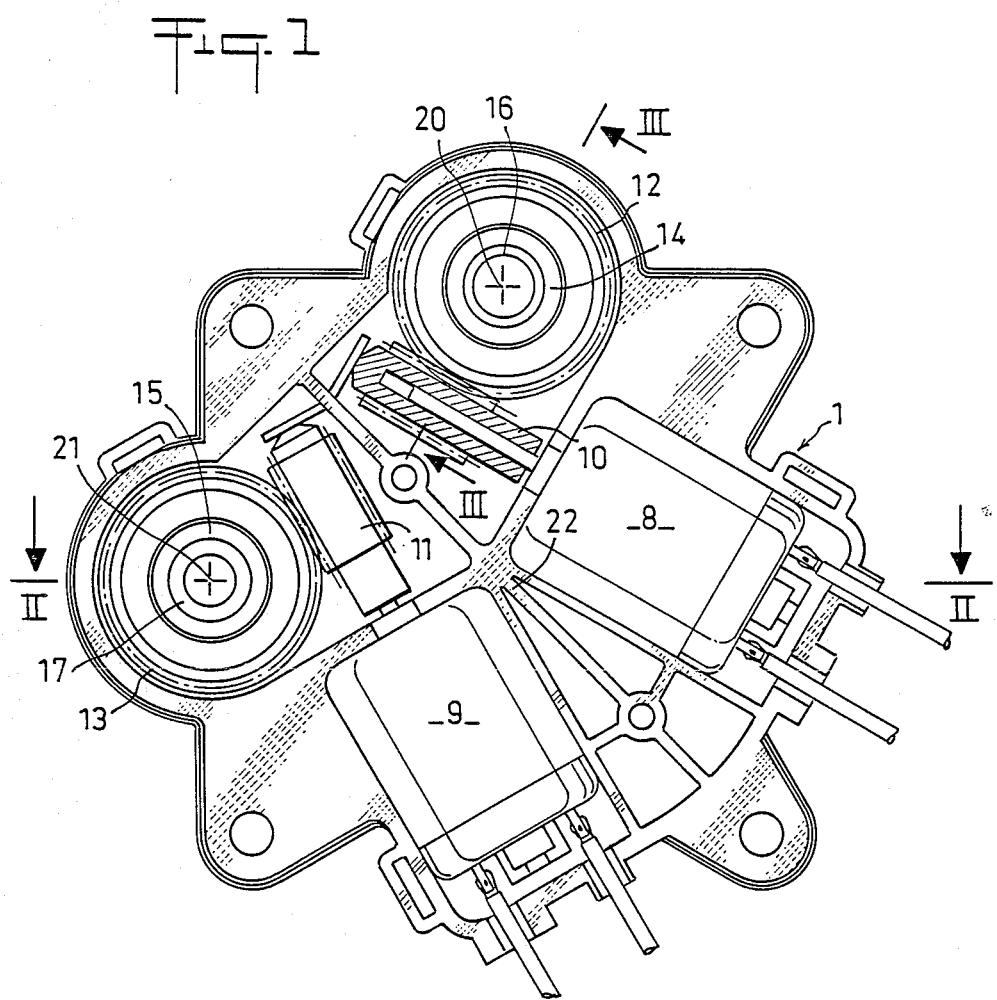
FIG. 1 is a plan view taken along line I—I of FIG. 2, showing the body equipped with the electric control casing of a rearview mirror.
Figure 2:
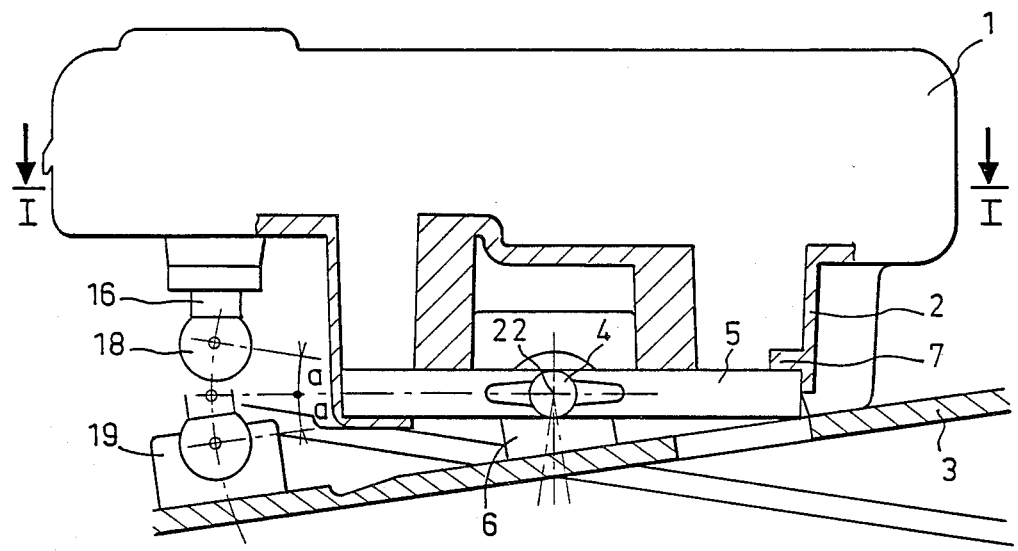
FIG. 2 is a schematic view taken, on a larger scale, partly in section, partly in elevation, along line II—II of FIG. 1 and rotated 180°
Figure 3:
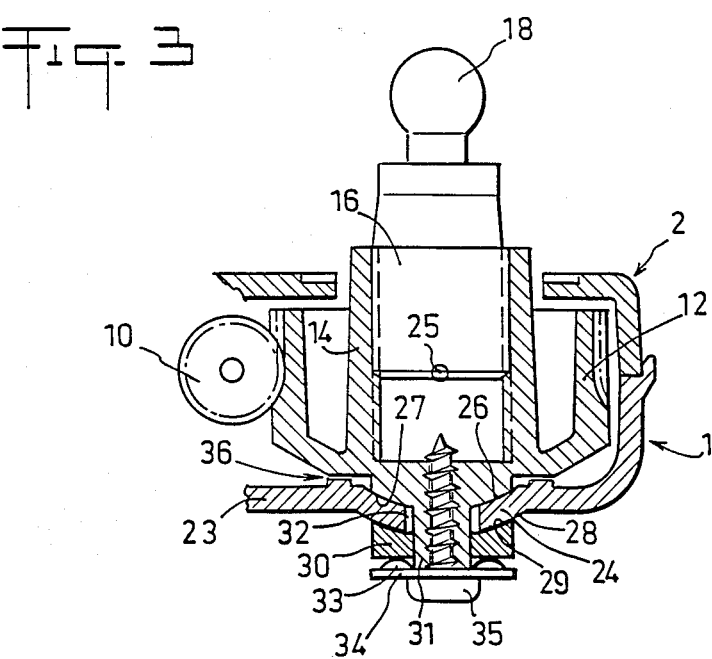
FIG. 3 is a partial section taken along line III—III of FIG. 1, illustrating the anti-vibration device according to the invention.

The improvement is described hereinafter with reference to FIG. 3 for the assembly of the nut 14 and is also applicable to the assembly of the nut 15.

The bottom 23 of the body 1 includes as easily moldable spherical-dish 24 of small camber and of relatively large surface. The dish 24 is defined by two concentric surfaces centered on a point 25 located between the bottom 23 and the cover 2. A concave inner spherical surface 26 constitutes a seat for an end bearing surface 27 of complementary shape defined by the nut 14. A convex outer spherical surface 28 constitutes a seat for a bearing surface 29 of complementary shape defined by a grip washer 30.

The grip washer 30 is fitted on a rod 31 extending the nut 14 and passing through an aperture 32 of larger diameter made in the dish 24. The rod 31 constitutes a guide in translation for the grip washer 30. An elastic member illustrated as a semi-toric, so-called Nomel washer 33, is interposed between the grip washer 30 and a wide washer 34 applied against the end of the rod 31 by a screw 35 blocked in the rod.

The nut 14, therefore, with the grip washer 30 constitutes a presser assembly rendering the dish 24 captive, which assembly may pivot about the center 25, but with a contact pressure on the bottom 23 of the casing body 1 which is limited and determined by the calibration of the semi-toric or spring lock washer 33. The latter also makes it possible to automatically make up for clearance caused by wear as it occurs.

Finally, an operational clearance 36 is made between the bottom 23 of the casing body 1 and the nut 14 around the dish 24, such clearance enabling the nut to pivot.

What is claimed is:

1. In combination with a rearview mirror of the type having an electric control for transmitting vibration-free up-down and left-right movements from the electric control to said rearview mirror, said rearview mirror having a casing; a mirror-holder plate adjacent said casing, a cover member attached at one end to said mirror-holder plate and an opposite end mounted to said casing; said casing defining a body member having a bottom portion; at least one control motor mounted to said bottom portion of said bottom member; means for transmitting rotary motion to translatory motion mounted between said at least one control motor and said mirror holder plate, said means for transmitting rotary motion to translatory motion having a spherical head screw located at one end of said at least one control motor; a tangent wheel gear located inside of said casing and communicating with said spherical head screw of said at least one control motor; said tangent wheel gear further having a control nut integrally mounted; a ball joint actuator having one end mounted to said tangent wheel gear and an opposite end having a ball joint mounted to said mirror-holder plate, the improvement comprising:

a spherical depression made in said bottom portion of said body member, said spherical depression defining a spherical concave seat within said casing; said spherical depression further defining a spherical convex surface seat on the outside surface of said casing, said spherical depression further having an aperture therein;

said tangent wheel gear having an outward extending portion, said outward extending portion being mounted in said aperture of said spherical depression, said outward extending portion further having a spherical surface circumscribing said outward extending portion for cooperation with said spherical depression in said bottom portion of said body member;

a washer member mounted to said spherical convex surface seat on the outside surface of said casing for cooperation therewith; and means for fastening said washer member to said spherical convex surface seat on the outside surface of said casing, said fastening means being mounted to said outward extending portion of said tangent wheel gear.

2. The combination as claimed in claim 1 wherein said means for fastening comprises:

a resilient member mounted against said washer member;

a wide washer member mounted adjacent said resilient member; and a fastening screw mounted to said outward extending portion of said tangent wheel gear such that as said fastening screw is fastened said wide washer moves against said resilient member to force said washer member against said spherical convex surface seat of said casing.

3. The combination as claimed in claim 2 wherein said resilient member is a semi-toric washer.

4. The combination as claimed in claim 3, further comprising a wide washer mounted adjacent said resilient member, and wherein said semi-toric washer abuts the head of said fastening screw received in said outward extending portion of said tangent wheel gear.

5. The combination as claimed in claim 1, wherein a clearance is created between said bottom of said casing and said tangent wheel gear surrounding said spherical surface circumscribing said outward extending portion of said tangent wheel gear.

* * * * *

UNITED STATES PATENT AND TRADEMARK OFFICE
CERTIFICATE OF CORRECTION

PATENT NO. : 4,871,246

DATED : October 3, 1989

INVENTOR(S) : Bernard Manzoni

It is certified that error appears in the above-identified patent and that said Letters Patent is hereby corrected as shown below:

Column 1, line 57, delete "eat" and insert ---- seat ----.

Column 2, line 38, delete "is" and insert ---- its ----.

Column 3, line 10, delete "and" second occurrence and insert ---- an ----.

Column 3, line 22, before "and" second occurrence insert ---- ; ----.

Column 3, line 35, delete "as" and insert ---- an ----.

Column 4, line 3, delete "casing," and insert ---- casing; ----.

Column 4, line 10, delete "mirror holder" and insert ---- mirror-holder ----.

Signed and Sealed this

Nineteenth Day of February, 1991

*Attest:*

HARRY F. MANBECK, JR.

*Attesting Officer*         *Commissioner of Patents and Trademarks*